July 11, 1950   R. C. HEERDINK   2,514,392
RELATIVE BEARING AND TARGET-ANGLE TRAINER
Filed Dec. 10, 1946

INVENTOR.
ROBERT C. HEERDINK
BY
*M. A. Hayes*

ATTORNEY

Patented July 11, 1950

2,514,392

UNITED STATES PATENT OFFICE 2,514,392

RELATIVE BEARING AND TARGET-ANGLE TRAINER

Robert Charles Heerdink, Los Angeles, Calif.

Application December 10, 1946, Serial No. 715,237

5 Claims. (Cl. 35—25)

(Granted under the act of March 3, 1883, as amended April 30, 1928; 370 O. G. 757)

This invention relates to training devices and in particular to a relative-bearing and target-angle trainer.

An object of this invention is to provide an apparatus for elementary instruction in estimating target angles and bearings.

Figure 1:
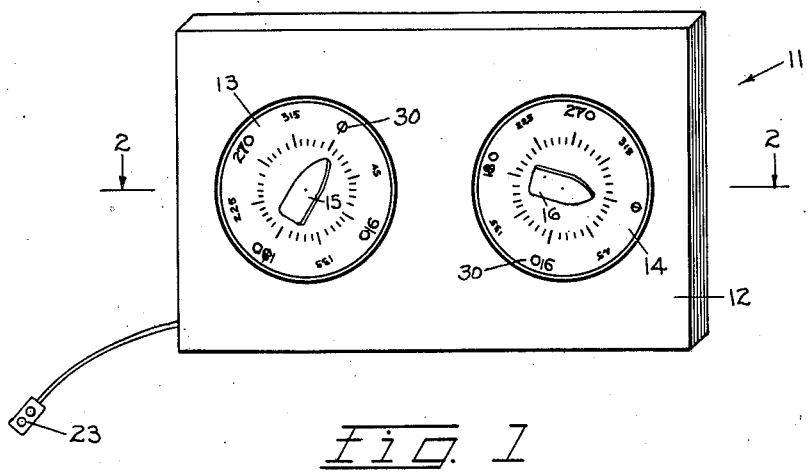

Further objects and advantages of this invention, as well as its construction, arrangement, and operation, will be apparent from the accompanying drawing and the following detailed description thereof. In the drawing Fig. 1 is a view in perspective illustrating one practical embodiment of this invention, and Fig. 2 is a cross-sectional plan, taken along the line 2—2 of Fig. 1.

A relative-bearing and target-angle trainer embodying the present invention is illustrated in the drawing and is generally designated 11. The trainer 11 comprises a light containing box or case 12, the front face of which has a plurality of circular holes or openings which are covered by the closures or discs 13 and 14. Ship models 15 and 16 are attached to the respective closures 13 and 14 at the centers of their faces exteriorly of the box 12. The discs 13 and 14 are marked with indicia 30 comprising 360° bearing circles corresponding with the respective ship models 15 and 16, the bearing circles 30 each being graduated in divisions of 5° or other suitable increments of angles. Each of the ship models 15 and 16, and respectively each bearing circles of indicia 30, are positioned on discs 13 and 14 for the bows of the ships to be each at the conventional 000° heading.

Discs 13 and 14 may be of a translucent material such as glass, plastic, or the like, and may be painted black with the bearing-circle markings 30 scratched into the paint to permit light to pass through the markings only. The ship models 15 and 16 are readily visible on the faces of the discs 13 and 14 that are exterior of the box 12 under ordinary light conditions in the room where the device is used. The observer sees the two ship models 15 and 16 side by side on a field comprising the face of box 12 that embodies discs 13 and 14. The bearing circles 30 on discs 13 and 14 are obscured except when case 12 is illuminated from within. Colored filters 24 are placed over bearing circles 13 and 14 to completely obscure the indicia 30 from view, which are therefore totally invisible to a student facing the box 12, who is able nevertheless to see the ship models 15 and 16 through the filters 24.

Figure 2:
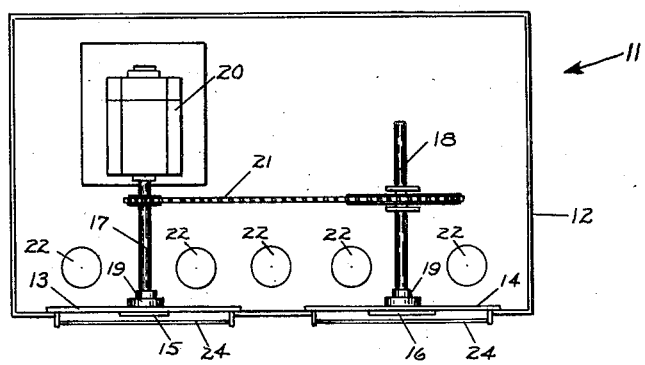

The apparatus for illuminating the indicia 30 of the bearing circles, and the apparatus for turning the closures or discs 13 and 14, as shown in Fig. 2.

Discs 13 and 14 are attached to respective shafts 17 and 18 by means of flanges 19. A mechanism is provided to rotate discs 13 and 14, such as, for example, an electric motor 20 geared to shaft 17 to drive disc 13, and a chain and sprocket 21 to drive shaft 18 and disc 14 carried thereby when shaft 17 with disc 13 rotates. The discs 13 and 14 therefore constitute rotary dials. To permit one motor 20 to give a wide variety of bearing and target-angle combinations, the sprocket wheels on shafts 17 and 18 are of different diameters. For example, by using an eight-to-one fractional gear ratio, disc 13 will make eight revolutions to one revolution of disc 14. The model ships 15 and 16 are mounted on the ends of shafts 17 and 18, which extend through discs 13 and 14 so that ships 15 and 16 rotate with discs 13 and 14. The indicia 30 of the bearing circles are illuminated from behind the discs 13 and 14 by a number of lamps 22 within the box 12 which are supplied from any suitable electrical source. Both the illumination by the lamps 22 and operation of the motor 20 are remotely controlled by push button switches 23 shown in Fig. 1. To change the relative orientation of the ship models 15 and 16, the motor push button of 23 is depressed until motor 20 turns dials 13 and 14 to the desired positions. When it is desired to show the markings 30 of the bearing circles, the illumination push button of 23 for the lamps 22 is depressed.

This trainer is adapted to teach the basic principles of estimation of relative bearings and target angles and for elementary drills in estimation of relative bearings and target angles.

The instructor operates the switch 23 for controlling the motor 20 to rotate the discs 13 and 14 until the ship models 15 and 16 assume a predetermined desired relative orientation. Students are then requested to state, with reference to one of the ship models 15 or 16 as the simulated ship of observation, what the relative-bearing and target-angle of the other ship is at the given setting. The instructor now operates the switch 23 that turns on the lights 22, rendering the bearing-circle markings of the discs 13 and 14 visible to the students, and enabling the students to determine the accuracy of their estimates of relative-bearing and target-angle.

The trainer can be made more readily portable by having the dials 13 and 14 manually operated and the illumination supplied by lights operated by batteries enclosed in case 12.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. In apparatus for teaching estimation of relative bearings and target angles, a plurality of dials positioned to view their faces side by side, a ship model on the face of each dial and each dial comprising indicia of a bearing circle disposed on the dial in conformance with the position of the ship model thereon, an illuminating system and a control therefore operable to selectively make the indicia visible and to obscure the indicia while the ship models remain visible, and means to rotate the several dials into selectively different relative orientations of their respective ship models.

2. In apparatus as defined in claim 1, the rotating means comprising a motor and a drive from the motor to the dials including a fractional gear ratio between dials.

3. In apparatus for teaching estimation of relative bearings and target angles, a light containing box having a plurality of circular openings in one face thereof, an opaque closure for each box opening comprising a dial, a ship model disposed at the center of each dial exteriorly of the box, each dial comprising translucent indicia of a bearing circle disposed on the dial in conformance with the position of the ship model thereon, an illuminating system inside the box and a control therefore operable to selectively illuminate and darken the interior of the box behind the dials, and means to rotate the several dials into selectively different relative orientations of their respective models.

4. In apparatus as defined in claim 3, the dials with the exterior of the box and the ship models being colored contrastingly, a light filter over each of the dials and its ship model that obscures the indicia completely but not the ship models when the interior of the box is darkened.

5. In apparatus for teaching estimation of relative bearings and target angles, a light containing box having a plurality of circular openings in one face thereof, an opaque closure for each box opening, comprising a dial, a ship model disposed at the center of each dial exteriorly of the box, each dial comprising translucent indicia of a bearing circle disposed on the dial in conformance with the position of the ship model thereon, mechanism for rotating the dials on their axes comprising an electrical motor and a drive from the motor to the several dials and between the dials, the drive between dials having a fractional gear ratio, an electrical illuminating system inside the box and a control therefore operable to selectively illuminate and darken the interior of the box behind the dials, and a control for operating the dial rotating mechanism at will.

ROBERT CHARLES HEERDINK.

REFERENCES CITED

The following references are of record in the file of this patent:

UNITED STATES PATENTS

| Number | Name | Date |
| --- | --- | --- |
| 1,463,470 | Johnson | July 31, 1923 |
| 2,045,619 | Smith | June 30, 1936 |
| 2,132,476 | En Holm | Oct. 11, 1938 |
| 2,166,864 | Gelardin | July 18, 1939 |
| 2,222,519 | Schwarz | Nov. 19, 1940 |